J. E. McCOUGHTRY.
TIRE.
APPLICATION FILED NOV. 8, 1913.

1,155,255.  Patented Sept. 28, 1915.

Witnesses
Christ Feinle, Jr.
R. M. Smith.

Inventor,
J. E. McCoughtry.
By Victor J. Evans,
Attorney.

UNITED STATES PATENT OFFICE.

JOHN EVERETT McCOUGHTRY, OF GARY, INDIANA.

TIRE.

1,155,255.  Specification of Letters Patent.  Patented Sept. 28, 1915.

Application filed November 8, 1913. Serial No. 799,971.

*To all whom it may concern:*

Be it known that I, JOHN E. McCOUGHTRY, a citizen of the United States, residing at Gary, in the county of Lake and State of Indiana, have invented new and useful Improvements in Tires, of which the following is a specification.

This invention relates to tires, the object of the invention being to produce a tire case for pneumatic tires which will be puncture proof, which will not be subject to blowouts.

With the above and other objects in view, the invention consists in the construction, combination and arrangement of parts, as will hereinafter be more fully described, illustrated and claimed.

Figure 1:
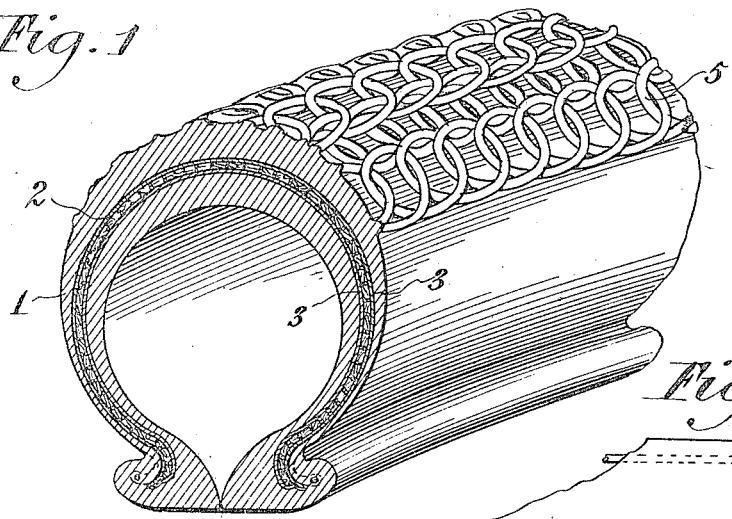
Figure 2:
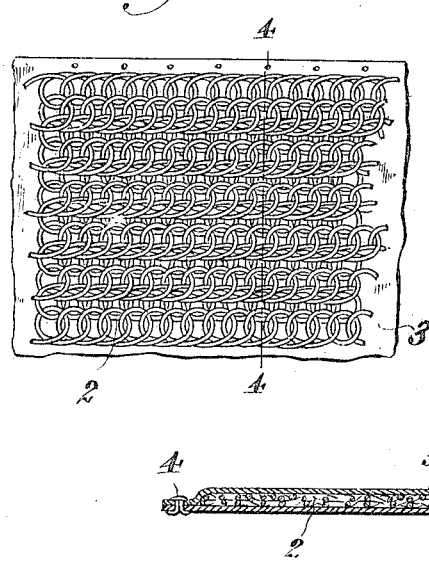
Figure 3:
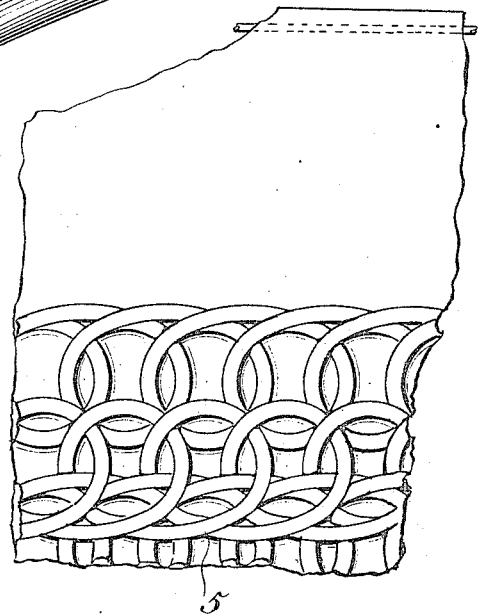
Figure 4:
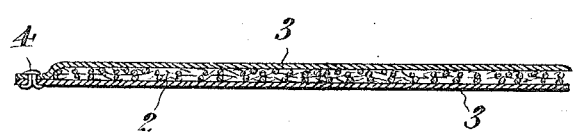

In the accompanying drawings:—Figure 1 is a cross section through the outer case of a pneumatic tire embodying the present invention, said view being projected into a perspective to illustrate the non-skid tread surface. Fig. 2 is a plan view of a fragment of the puncture proof armor or core, the same being spread out to better illustrate the form and relation of the convolutions of the coils. Fig. 3 is a plan view of a fragment of the tread surface of the tire illustrating the form thereof. Fig. 4 is a cross section on the line 4—4 of Fig. 2 showing the insulating sheets in their relation to the armor sheet.

Referring to the drawings 1 designates the body of the outer case of a pneumatic tire, said body being formed of rubber or other resilient material preferably combined with reinforcing and strengthening fabric and cured together as a whole by any of the processes now in common use.

In carrying out the present invention I employ a core which is incorporated in and entirely incased by the body 1 of the outer case as indicated in Fig. 1. This core embodies a puncture proof sheet 2 a portion of which is clearly illustrated in Fig. 2, the said sheet being composed of tough coiled springs extending parallel to each other and longitudinally of the tire. The coils are alternately right and left hand ones and the convolutions of each coil are interwoven or interlaced with the adjacent convolutions of the coils at each side thereof so that all of the coils are interlocked and woven into a complete sheet, leaving such small spaces as to prevent ordinary nails and similar objects from passing through said armor sheet.

At opposite sides of the armor sheet 2 are arranged insulating sheets 3 each of which is composed of heavy closely woven textile fabric, such fabric being impregnated thoroughly with a preparation of zinc-oxid mixed and combined with pure tar to a heavy consistency. This preparation is generously applied to each of the insulating sheets so as to thoroughly impregnate and saturate the same in order that the preparation may find its way readily to all of the convolutions of the metallic armor sheet. As a result, the entire armor sheet is lubricated and supplied at all times with said preparation which not only has the effect of lubricating the convolutions and preventing wear and chafing thereof but also has the effect of preventing the overheating of the tire which ordinarily follows the use of metal in a tire the walls of which are subjected to continuous bending. The insulating sheets are of the same area as the armor sheet 1 and may be secured or their marginal edges by means of fasteners 4 of any desired form.

The outer tread surface of the body 1 of the tire is molded to form a raised outline 5 simulating on a larger scale the form and arrangement of the interwoven convolutions of the armor sheet contained and incorporated within the body 1. This imparts an exclusive appearance to the tire, the general advantage, however, residing in the non-skid property of the tire as a result of the formation of the raised and interwoven convolutions referred to.

The tire hereinabove described is practically puncture proof, non-skid, and not subject to blow outs for the reason that the puncture proof sheet, together with the insulating sheets which cover the same on both sides, extends to the extreme marginal edges and fastening beads of the outer case, thereby making it next to impossible for excessive air pressure to disrupt the walls of the outer case. The convolutions of the coils are thoroughly toughened by any well known process such as tempering the same in oil and are mashed or rolled flatly against each other so as to form a puncture proof armor of the least possible thickness commensurate with the construction involving the use of interwoven right and left hand coils.

The preparation with which the insulating sheets are impregnated acts to automatically heal all ordinary cuts to which the outer case or shoe of a pneumatic tire is subjected, said preparation remaining in a semi-liquid condition so that it will quickly fill all of said cuts. Furthermore the preparation referred to keeps back dampness and prevents the same from attacking the inner plies of fabric which soon results in destroying the tensile strength of textile fabric, precipitating rotting and final destruction of the fabric. The armor sheet also prevents gravel from working its way into the inner part of the outer case or shoe, doing away with punctures caused on this account.

What I claim is:—

A core for pneumatic tires embodying a non-puncturable sheet of metallic armor, and sheets fastened together at their opposite edges and composed of closely woven textile fabric impregnated with a semi-liquid lubricating preparation of zinc-oxid mixed with tar, said sheets being located at opposite sides of said armor sheet and inclosing the latter.

In testimony whereof I affix my signature in presence of two witnesses.

JOHN EVERETT McCOUGHTRY.

Witnesses:
   JNO. M. SWEENEY,
   F. KLEINSCHMIDT.

Copies of this patent may be obtained for five cents each, by addressing the "Commissioner of Patents, Washington, D. C."